Figure 1:
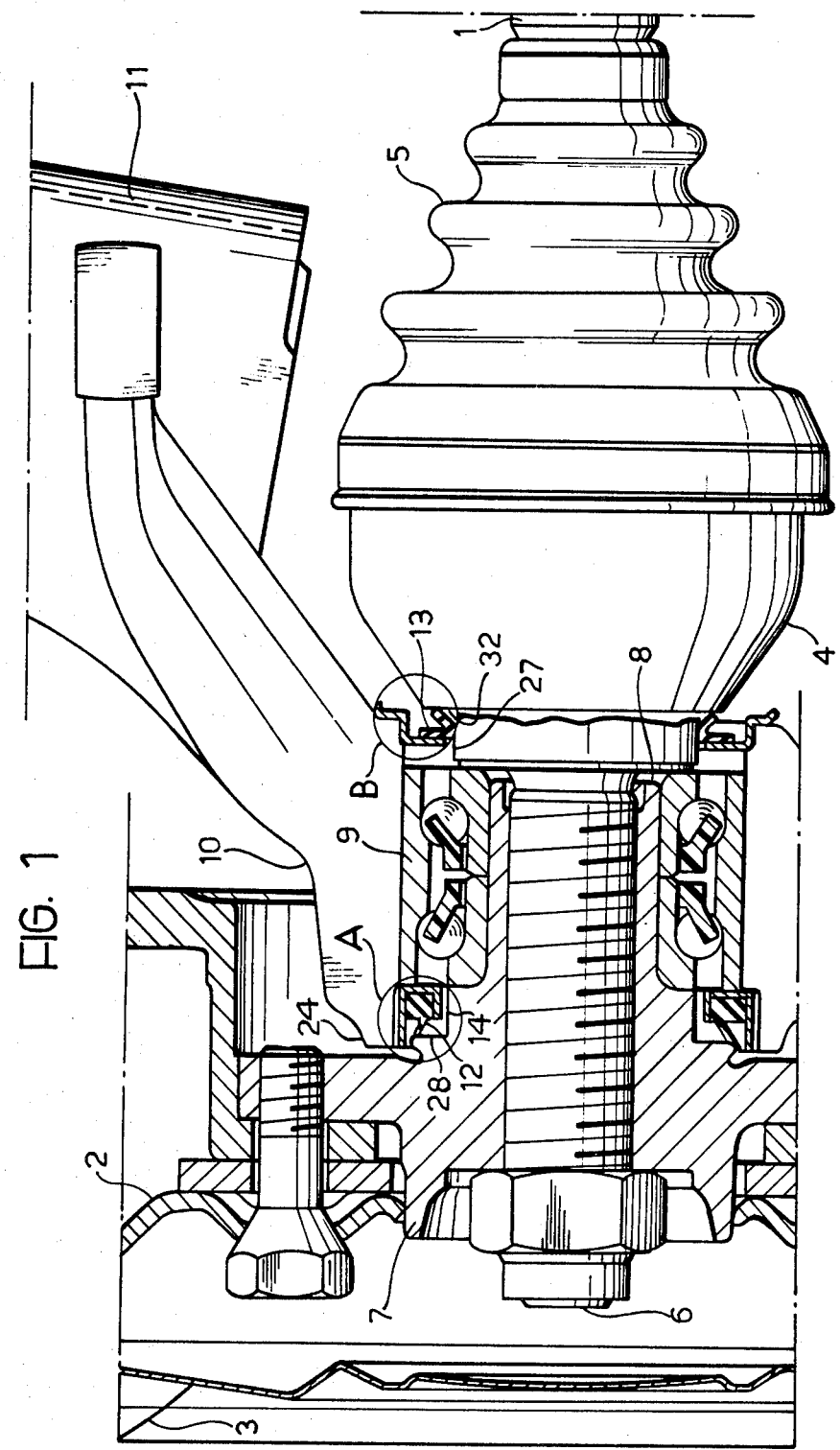

United States Patent [19]

Filippa

[11] 4,217,007

[45] Aug. 12, 1980

[54] DEVICE FOR THE SEALING AND PROTECTION OF A MOTOR VEHICLE WHEEL BEARING

[75] Inventor: Eugenio Filippa, Piossasco, Italy

[73] Assignee: Fiat Auto S.p.A., Turin, Italy

[21] Appl. No.: 3,682

[22] Filed: Jan. 15, 1979

[30] Foreign Application Priority Data

Jan. 23, 1978 [IT] Italy ................ 67117 A/78

[51] Int. Cl.² ............................................. F16C 33/78
[52] U.S. Cl. ................................... 308/36.2; 308/16; 308/187.1
[58] Field of Search ................... 308/36.2, 36.1, 187.1, 308/16, 187.2, 187; 277/95

[56] References Cited

U.S. PATENT DOCUMENTS

| | | | |
|---|---|---|---|
| 2,233,557 | 3/1941 | Shager | 308/36.2 |
| 3,994,545 | 11/1976 | Van Dorn | 308/187.1 |
| 4,129,345 | 12/1978 | Krude | 308/187.1 |

*Primary Examiner*—Lenard A. Footland
*Attorney, Agent, or Firm*—Sughrue, Rothwell, Mion, Zinn and Macpeak

[57] ABSTRACT

A wheel bearing of a front-wheel-drive vehicle is protected by a pair of elastomeric annular sealing elements on opposite sides of the bearing, each having a resiliently yieldable oblique sealing lip for sealing contact with relatively rotating surfaces. Each sealing element is supported by a channel section metal support to which the sealing element is bonded by vulcanization.

7 Claims, 4 Drawing Figures

DEVICE FOR THE SEALING AND PROTECTION OF A MOTOR VEHICLE WHEEL BEARING

The present invention relates to a device for sealing and protecting wheel axle bearings, particularly for motor vehicles with front-wheel drive.

A known such sealing device comprises a sealing ring of elastomeric material positioned on the shaft of a homokinetic joint of a front wheel drive axle and removably contained in an annular metal housing. Such a device, however, not only has inadequate sealing, but also suffers from rapid wear of the sealing ring due to its rotation on the shaft of the joint. This is an economic disadvantage since it necessitates frequent replacement of the sealing ring, involving the disassembly and reassembly of the component parts, with the vehicle out of action. Moreover, such devices has considerable weight and size and are difficult to manufacture.

An object of the present invention is to avoid the difficulties referred to above by providing a device which effects a better, more durable seal, using sealing elements which are irremovably attached to support members.

According to the present invention there is provided a device for the sealing and protection of a wheel bearing for a motor vehicle, characterised in that the device comprises of a pair of annular elastomeric sealing elements spaced apart axially, each of which incorporates an oblique contact lip which effects sealing, one of the sealing elements being attached to an annular screw-threaded metal support member adapted to be screwed into one end of a bearing mounting and the other sealing element being attached to an annular metal support member adapted to be fitted to the bearing mounting on the opposite side of the bearing from the said one sealing element.

The ring nut and the cap may be made by straightforward pressing operations from sheet metal, with evident advantages of reduced weight and ease of manufacture, and consequent reduction in cost.

By attaching the sealing elements to respective annular support members the assembly of the wheel bearing is simplified, and the working lifetime of the device is increased, as a result of the reduced wear on the sealing elements themselves, which are static in operation of the device.

Figure 2:
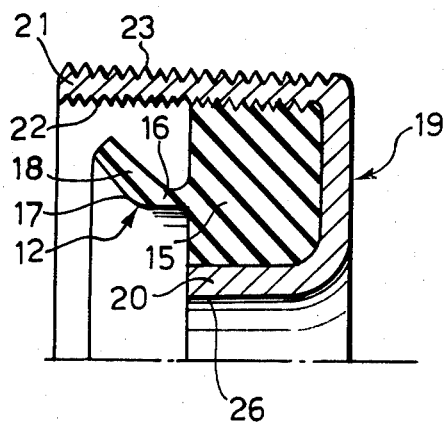
Figure 3:
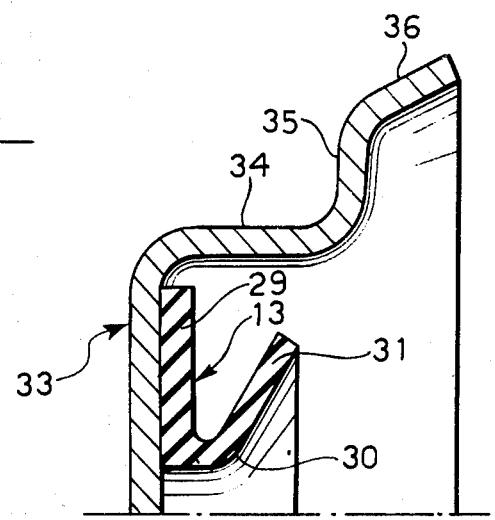
Figure 4:
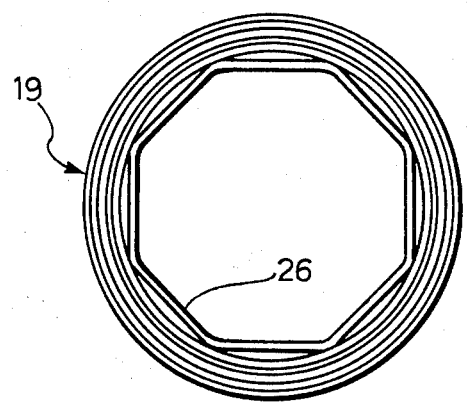

The invention will be further described, by way of non-limiting example, with reference to the accompanying drawings, in which:

FIG. 1 is a partial axial section of a front axle of a front-wheel drive motor vehicle, including a sealing device according to one embodiment of the invention;

FIGS. 2—3 are partial-axial sections on an enlarged scale of details of the device shown respectively within the circles marked "A" and "B" in FIG. 1, and FIG. 4 is an end view of the component shown partially in FIG. 2, on a reduced scale compared with FIG. 2.

Referring to FIG. 1, a complete bearing assembly for a front wheel axle 1 of a front-wheel drive motor vehicle is shown.

The axle 1 transmits drive from a differential (not shown) to a front wheel 3 having a pressed metal disc 2 to which the outer end of the shaft 1 is coupled through a homokinetic joint 4.

The homokinetic joint 4 is enclosed in a protective muff 5 and transmits drive from the shaft 1 to a drive shaft 6. An internally screw-threaded hub 7 is secured to a threaded end of the shaft 6, the wheel disc 2 being bolted to the hub 7. The hub has a tubular portion 8 which is rotatably supported in a mounting 10 by means of a thrust ball bearing 9. The mounting 10 has an arm attached to the lower end of a shock absorber 11 forming part of the suspension of the vehicle.

Annular sealing elements 12 and 13 are located on opposite sides of the bearing 9 for the purpose of sealing the bearing 9 against the infiltration of foreign bodies.

The annular sealing element 12 is seated concentrically on an annular shoulder 14 of the wheel nut 7. The sealing element 12 has in cross section a rectangular body 15 (FIG. 2) from which an oblique sealing lip 18 projects, the lip 18 adjoining the body 15 through a neck 16 of relatively reduced thickness which has an internal radiused surface 17 merging with the lip 18.

The sealing element 12 is made of elastomeric material of high quality composition and the body 15 is vulcanized in an annular channel of an annular metal support member 19, the open side of the channel facing axially towards the wheel hub 7. The support member 19 is in the form of a ring nut having an inner wall 20 formed with a hexagonal socket (FIG. 4), and an outer cylindrical wall 21 which is both internally and externally threaded. The body 15 of the sealing element 12 is firmly engaged with the internal thread 22 of the wall 21. The external thread 23 is screwed into an internally threaded end portion 24 of the mounting 10 to secure the support member 19, and therefore the sealing element 12, to the mounting 10. Such fixing is carried out by the insertion of a suitable hexagon-headed tool into the hexagonal socket of the support member 19.

The sealing element 12 is effectively secured to the support member 19, and sealing is effected by the lip 18, the attachment neck 16 of which flexes resiliently so as to increase the contact pressure between lip 18 and a radial shoulder 28 on the hub 7 to seal the bearing 9 at the end of thereof facing towards the wheel 3.

The seal support member 19 is made by pressing sheet metal rather than by the machining of bar stock, followed by the forming of the internal and external threads 22, 23, so that the resulting seal is of relatively low weight and is simple and inexpensive to manufacture.

The annular sealing element 13 is also made of elastomeric material with properties similar to those of the sealing element 12. The sealing element 13 is located concentrically on a land 27 formed on the shaft 6 of the homokinetic joint 4. The sealing element 13 has a circumferential annular base portion of rectangular section 29, from which an oblique sealing lip 31 projects, adjoining the base portion 30 through an internal radiused surface 30. The lip 31 makes resilient sealing contact with a radial shoulder 32 formed on the shaft 6 adjacent the land 27 (FIG. 3).

The base portion 29 of the sealing element 13 is bonded by vulcanization to an annular support member comprising a pressed sheet metal cap 33. The cap 33 is formed with a cylindrical portion 34 which is force-fitted in the end of the mounting 10 opposite the end portion 24 of the mounting 10. The cap 33 has a radial wall 35 projecting outwardly from the cylindrical portion 34 which abuts an end face of the mounting. The radial wall 35 terminates in a frusto-conical end portion 36 which acts as a deflector protecting the sealing element 13 from rainwater.

The sealing element 13, like the sealing element 12, serves to protect and seal the bearing 9.

It will be understood that the invention herein described may be embodied in various forms without departing from the scope of the invention.

I claim:

1. A motor vehicle wheel bearing assembly comprising a mounting, a bearing, rotary means supported within the mounting by the bearing, and a device for the sealing and protection of the wheel bearing comprising: a pair of annular sealing elements of elastomeric material, spaced apart axially on the mounting, each sealing element having an oblique contact lip which makes sealing contact with a respective cooperating face of the rotary means: an annular screw-threaded first metal support member in screw-threaded engagement with one end of the bearing mounting, one of the sealing elements being attached to said first support member; and an annular second metal support member to which the other sealing element is attached, said second support member being fitted to the bearing mounting on the opposite side of the bearing from said first support member.

2. The bearing assembly defined in claim 1, wherein said first annular support member comprises a sheet metal pressing provided with a circumferential outer annular wall having an internal thread engaging said one sealing element and an external thread engaging the mounting.

3. The bearing assembly defined in claim 1, wherein the screw-threaded first support member is formed with a hexagonal socket.

4. The bearing assembly defined in claim 1, wherein the sealing elements are attached to the respective support members by vulcanisation.

5. The bearing assembly defined in claim 1, wherein the second support member comprises an annular cap of pressed sheet metal incorporating an outwardly projecting frusto-conical wall portion terminating in a free edge and acting as a rainwater deflector for the protection of the associated sealing element.

6. The bearing assembly defined in claim 1, wherein at least one of the sealing elements comprises a body portion with which the oblique contact lip is integrally formed, and a resiliently flexible neck, of reduced thickness compared with the lip, by which the lip adjoins the body portion.

7. The bearing assembly defined in claim 1, wherein the rotary means comprises a drive shaft and a homokinetic joint coupling the drive shaft to an associated vehicle wheel.

* * * * *